United States Patent
Plucinski et al.

(10) Patent No.: US 12,424,371 B2
(45) Date of Patent: Sep. 23, 2025

(54) LINEAR VARIABLE DIFFERENTIAL TRANSDUCER

(71) Applicant: Hamilton Sundstrand Corporation, Charlotte, NC (US)

(72) Inventors: Wojciech Plucinski, Wrzesnia (PL); Michal Zgorecki, Grodkow (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 240 days.

(21) Appl. No.: 17/075,889

(22) Filed: Oct. 21, 2020

(65) Prior Publication Data
US 2021/0118600 A1    Apr. 22, 2021

(30) Foreign Application Priority Data

Oct. 21, 2019   (EP) ..................................... 19461594

(51) Int. Cl.
*H01F 27/29*    (2006.01)
*H01F 21/06*    (2006.01)
*H01F 27/24*    (2006.01)
*H01F 27/28*    (2006.01)
*G01D 5/22*     (2006.01)

(52) U.S. Cl.
CPC ............. *H01F 21/06* (2013.01); *H01F 27/24* (2013.01); *H01F 27/2823* (2013.01); *G01D 5/2291* (2013.01)

(58) Field of Classification Search
CPC ...... H01F 21/06; H01F 27/24; H01F 27/2823; H01F 41/06; H01F 29/00; H01F 2038/122; G01D 5/2291
See application file for complete search history.

(56) References Cited

U.S. PATENT DOCUMENTS

| | | | | |
|---|---|---|---|---|
| 3,054,976 | A * | 9/1962 | Lipshutz | H01F 29/10 336/183 |
| 4,694,246 | A | 9/1987 | Avisse | |
| 4,808,958 | A | 2/1989 | Hewitt et al. | |
| 5,061,896 | A | 10/1991 | Schmidt | |
| 7,317,371 | B1 * | 1/2008 | Carroll | G01D 5/2291 336/130 |
| 8,264,315 | B2 * | 9/2012 | Fox | G01D 5/2291 336/130 |
| 8,692,643 | B2 * | 4/2014 | Weber | H01F 27/2895 336/208 |

(Continued)

FOREIGN PATENT DOCUMENTS

EP       3471114 A1    4/2019

OTHER PUBLICATIONS

Extended European Search Report for International Application No. 19461594.4 dated May 4, 2020, 9 pages.

*Primary Examiner* — Mang Tin Bik Lian
(74) *Attorney, Agent, or Firm* — CANTOR COLBURN LLP (57) ABSTRACT

A linear variable differential transducer (LVDT) includes a primary coil, a first secondary coil, and a second secondary coil. Each of the first and second secondary coils comprises a wound portion that is wound around a longitudinal axis of the LVDT, and first and second non-wound portions at either end of the wound portion. The wound portion meets the first and second non-wound portions at locations that are separated from each other in a direction along the longitudinal axis.

12 Claims, 4 Drawing Sheets

(56) References Cited

U.S. PATENT DOCUMENTS

| | | | |
|---|---|---|---|
| 9,863,787 B2 | 1/2018 | Hubbell | |
| 10,332,675 B2 | 6/2019 | Esakki et al. | |
| 2010/0127695 A1* | 5/2010 | Harris | G01D 5/202 |
| | | | 324/207.16 |
| 2012/0225784 A1* | 9/2012 | Piascik | H01F 27/327 |
| | | | 505/433 |
| 2013/0088217 A1* | 4/2013 | Grosse | G01B 7/003 |
| | | | 324/207.17 |
| 2013/0293340 A1* | 11/2013 | Weber | H01F 27/327 |
| | | | 336/220 |
| 2015/0108969 A1* | 4/2015 | Krenik | G01D 5/2258 |
| | | | 324/207.18 |
| 2015/0354991 A1* | 12/2015 | Graf | H01F 5/04 |
| | | | 29/605 |
| 2016/0033306 A1* | 2/2016 | Hubbell | G01D 5/2291 |
| | | | 244/76 R |
| 2017/0352464 A1* | 12/2017 | Sanchihar | G01D 5/2291 |
| 2018/0197677 A1* | 7/2018 | Esakki | H01F 29/10 |

* cited by examiner

LINEAR VARIABLE DIFFERENTIAL TRANSDUCER

FOREIGN PRIORITY

This application claims priority to European Patent Application No. 19461594.4 filed Oct. 21, 2019, the entire contents of which is incorporated herein by reference.

FIELD

The present disclosure relates to Linear Variable Differential Transducers (LVDTs) and in particular to the winding configurations of the coils therein.

BACKGROUND

LVDTs are used to detect or measure the displacement of moving components, such as a spool in a servovalve, or in any kind of actuator. An LVDT generally comprises three wire coils surrounding a moveable magnetic core. A primary coil is provided with a current, which induces currents in the secondary coils. The induced currents can be used to determine the position of the moveable magnetic core.

SUMMARY

The present disclosure provides a linear variable differential transducer (LVDT) comprising a primary coil, a first secondary coil, and a second secondary coil. Each of the first and second secondary coils comprises a wound portion that is wound around a longitudinal axis of the LVDT, and first and second non-wound portions at either end of the wound portion. The wound portion meets the first and second non-wound portions at locations that are separated from each other in a direction along the longitudinal axis.

The wound portion of each secondary coil may meet its first and second non-wound portions at locations that are spaced apart from each other in a direction along the longitudinal axis by a distance of $\geq 2$ mm, $\geq 3$ mm, $\geq 4$ mm, $\geq 5$ mm, $\geq 6$ mm, $\geq 7$ mm, $\geq 8$ mm, $\geq 9$ mm, $\geq 10$ mm, $\geq 15$ mm, or $\geq 20$ mm.

When each of the primary coil, first secondary coil and second secondary coil are formed, the wire of the coil is wound around the longitudinal axis multiple times. The wire is wound in a helical manner. The wire may be wound around the longitudinal axis at a winding pitch such that there are no gaps between axially adjacent loops of the wound portion of the coil. The wire may comprise an insulating outer layer surrounding a conductive core, such that the conductive core of adjacent loops of the wound portion of the coil are not in electrical communication with one another.

The wire is wound whilst moving in a first axial direction so as to form a first (tubular) wound layer of the coil extending in an axial direction along the longitudinal axis. The wire may continue to be wound whilst moving in a second, opposite axial direction along the longitudinal axis, thus forming a second (tubular) wound layer radially outwards of the first layer. The wire may be wound whilst moving back and forth along the longitudinal axis so as to form any desired number of layers, one on top of the other. The different layers may have different lengths in the axial direction.

The wound portion in each of the first and second secondary coils may comprise a plurality of wound layers.

The wound portion in each of the first and second secondary coils may consist of an odd number of wound layers.

The wound portions of the first and second secondary coils may be arranged axially adjacent to one another such that axial ends of the layers in the wound portion of the first secondary coil are axially adjacent axial ends of the layers in the wound portion of the second secondary coil.

The wound portion of each of the first and second secondary coil may comprise wound layers having different lengths in the longitudinal direction.

The layers may be arranged in a stepped configuration, wherein layers that are radially adjacent one another and extend the same axial distance form a single one of the steps in the stepped configuration. Different steps are formed by layers having different axial lengths. Any number of layers may form each step. The steps may either progressively increase or decrease in longitudinal length as a function of distance in the radial direction. For example, travelling from the radially innermost step to the radially outermost step, either each step will be shorter than the preceding step, or each step will be longer than the preceding step.

The first (radially innermost) layer of each secondary coil may extend a first longitudinal length in an axial direction. The second (radially adjacent) layer may extend the same length in the axial direction. Third and fourth (radially outward) layers may then extend a second length in the axial direction. In this embodiment, the first and second layers have formed a first step, and the third and fourth layers have formed a second step. Alternatively, the third and fourth layers may also extend the first length in the outward axial direction. In this case, the third and fourth layers have formed part of the same step as the first and second layers.

The wound layers of the first secondary coil may have lengths in the longitudinal direction that decrease as a function of increasing radial distance within that coil; and wherein the would layers of the second secondary coil have lengths in the longitudinal direction that increase as a function of increasing radial distance within that coil.

The wound portion of each of the first and second secondary coils may have a conical configuration.

The first and second secondary coils may be positioned circumferentially around the primary coil.

The may comprise a magnetic core located radially inside of the primary coil, wherein the magnetic core is mounted in the LVDT so as to be movable along the longitudinal axis.

The LVDT may comprise circuitry for determining the position of the magnetic core along the longitudinal axis from the potential difference between the first and second non-wound portions of the first secondary coil and from the potential difference between the first and second non-wound portions of the second secondary coil.

The present disclosure also provides a method of forming an LVDT as described herein. The method may comprise: i) winding a wire around the longitudinal axis, starting at a first axial location, and whilst moving in a first axial direction along the longitudinal axis so as to form a first wound layer of the first secondary coil; ii) winding the wire around the longitudinal axis whilst moving in a second, opposite axial direction along the longitudinal axis so as to form a second wound layer of the first secondary coil; and iii) repeating steps i) and ii) until the first secondary coil has the desired number of wound layers; wherein the winding is terminated at a second axial location that is spaced apart along the longitudinal axis from the first axial location.

The method may further comprise: i) winding a wire around the longitudinal axis, starting at a third axial location, and whilst moving in the second axial direction along the longitudinal axis so as to form a first wound layer of the second secondary coil; ii) winding the wire around the longitudinal axis whilst moving in the first axial direction along the longitudinal axis so as to form a second wound layer of the second secondary coil; and iii) repeating steps i) and ii) until the second secondary coil has the desired number of wound layers; wherein the winding is terminated at a fourth axial location that is spaced apart along the longitudinal axis from the third axial location.

BRIEF DESCRIPTION OF DRAWINGS

Various embodiments will now be described, by way of example only, and with reference to the accompanying drawings in which.

DETAILED DESCRIPTION

Figure 1A:
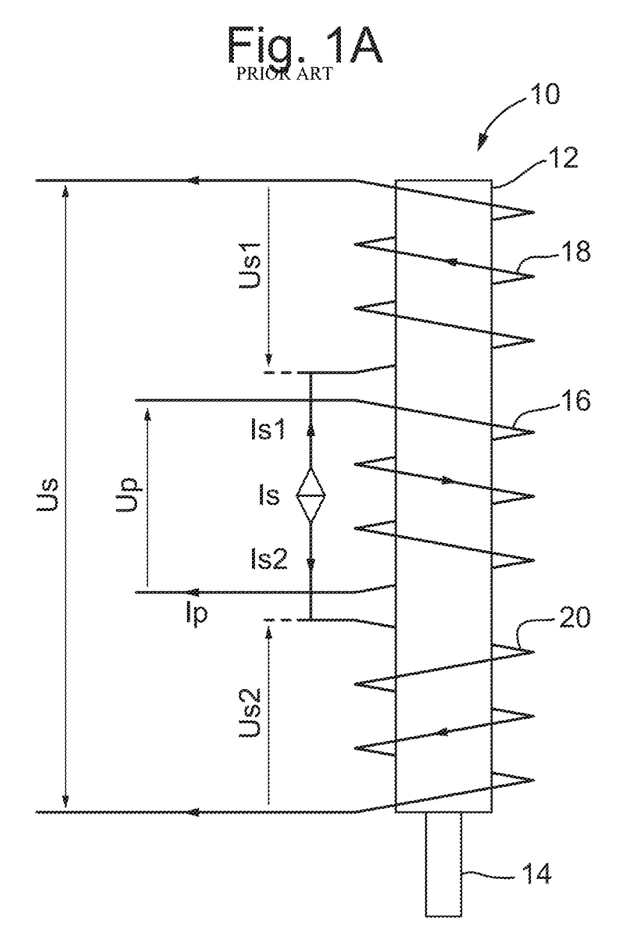
FIGS. 1A and 1B show a prior art Linear Variable Differential Transducer (LVDT)
Figure 1B:
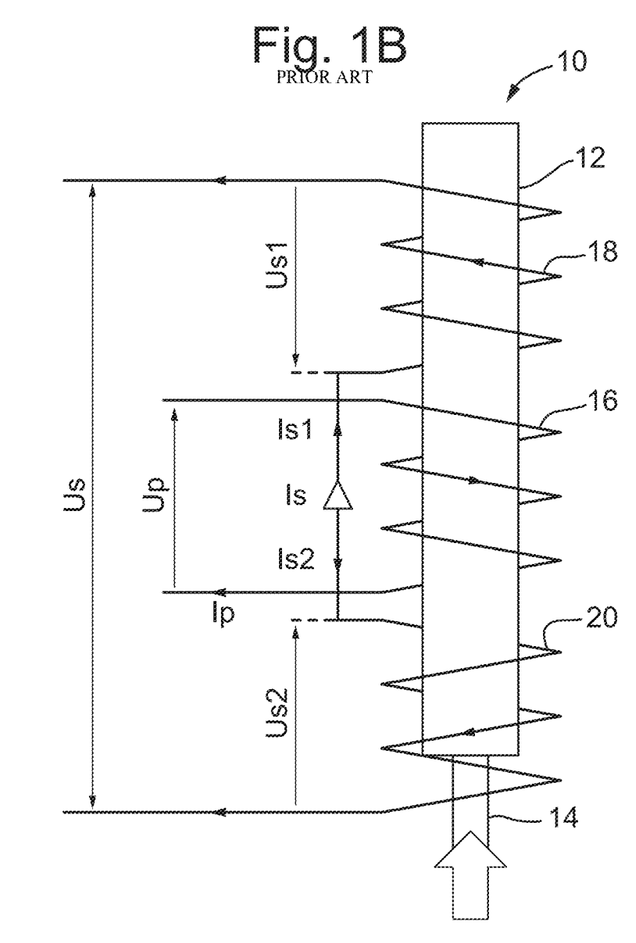

FIGS. 1A and 1B show a prior art Linear Variable Differential Transducer (LVDT) 10 which may be used to detect or measure the displacement of a moving component. The LVDT 10 comprises a tubular magnetic core 12 mounted on a core support 14. The magnetic core 12 may comprise a soft magnetic material, e.g. Mu-metal. The core support 14 is attached to the actuating element whose displacement is to be measured or detected by the LVDT.

The LVDT further comprises a primary coil 16 for generating a magnetic field when supplied with power, a first secondary coil 18 in which a current is induced by the magnetic field from the primary coil 16, and a second secondary coil 20 in which a current is induced by the magnetic field from the primary coil 16. The coils 16, 18, 20 may be wound around a common axis. The first and second secondary coils 18, 20 are substantially identical (i.e. they comprise the same material, the same number and/or pitch of windings, and have the same dimensions). However, the secondary coils 18, 20 may be wound around the axis in opposite directions. The coils 16, 18, 20 are usually placed on a bobbin attached to a housing or another element, which the magnetic core 12 is displaced relative to.

The coils 16, 18, 20 have the same longitudinal axis 24 as the magnetic core 12 and core support 14. The coils 16, 18, 20 wind around or encircle portions of the magnetic core in the longitudinal direction. The primary coil 16 is located between the first secondary coil 18 and the second secondary coil 20, and is equidistant from each. The core support 14 moves relative to the coils 16, 18, 20 along the longitudinal axis 24, allowing the magnetic core 12 to be displaced relative to the coils 16, 18, 20.

The primary coil 16 is supplied with an alternating voltage Up (i.e. by an AC voltage supply), causing an alternating current Ip in the primary coil 16. This causes a magnetic field to be generated in the known manner, which is somewhat confined and focussed by the magnetic core 12. The magnetic core 12 helps transfer the magnetic field to the first and second secondary coils 18, 20, inducing currents Is1 and Is2 respectively in the first and second secondary coils 18,20. The first and second secondary coils 18, 20 will thus have potential differences Us1 and Us2 across them respectively. The resulting potential difference across the two secondary coils Us=Us1+Us2.

LVDTs may be used for various purposes, such as in valves and actuators, for example in engines.

FIG. 1A shows the LVDT when the magnetic core 12 is located centrally within the coils 16, 18, 20 along the longitudinal axis 24, such that the magnetic core 12 extends the same distance into or beyond each of the first and second secondary coils 18, 20. When the primary coil 16 is supplied with an alternative voltage Up, the currents generated in the first and second secondary coils 18,20 will be of the same magnitude, but in opposite directions, i.e. Is1=−Is2. The resultant potential difference Us of the combined secondary coils 18, 20 will thus be zero.

FIG. 1B shows the LVDT 10 when the magnetic core 12 has been displaced relative to the coils 16, 18, 20 from the central position along the longitudinal axis 24. In the depicted embodiment, the magnetic core 12 has been moved in the longitudinal direction towards the first secondary coil 18. The magnetic core 12 extends all the way through the first secondary coil 18, but only part way through the second secondary coil 20. When the primary coil 16 is supplied with the alternating voltage Up, currents Is1 and Is2 are generated in the first and second secondary coils 18, 20 as described above, and the current Is1 generated in the first secondary coil 18 will be greater in magnitude than the current Is2 generated in the second secondary coil 20. Therefore, the resultant potential difference Us across the secondary coils 18, 20 will no longer be zero. In fact, the magnitude of the currents Is1 and Is2 (and hence the potential difference Us) depends on the proportion of the coil through which the magnetic core 12 extends. Accordingly, the value of the potential difference Us is correlated to the position of the magnetic core 12.

The LVDT includes a control unit for measuring the currents Is1 and Is2 and/or the voltages Us1 and Us2 of the secondary coils 18, 20. The control unit includes a processor to compare Us1 and Us2 and determine the resultant voltage Us. The resultant voltage is indicative of the displacement of the magnetic core 12 and hence of the position of the moving component to which the magnetic core 12 is connected.

In the arrangement described above, each coil is shown as being wound around the longitudinal axis 24 so as to form a single (wound) layer. However, it is known to wind each coil around the longitudinal axis 24 whilst moving in a first axial direction along the longitudinal axis 24, and then continue to wind the coil around the around the longitudinal axis 24 whilst moving in the second, opposite axial direction along the longitudinal axis 24 so as to form a coil having two (wound) layers. This process may include continuing to wind the coil around the longitudinal axis 24 whilst moving in the first axial direction again so as to form a third layer. Similarly, the process may further include continuing to wind the coil around the longitudinal axis 24 whilst moving in the second axial direction again so as to form a fourth layer. This may be repeated so as to form each coil with the desired number of layers.

It is contemplated in the present disclosure that each of the secondary coils may be wound such that at least some of the layers in each secondary coil have different lengths in the axial direction, e.g. to thereby provide a substantially conically shaped wound coil. Such conically shaped coils enable the position of the magnetic core (and thus of the moving component to which the magnetic core is connected) to be determined more accurately.

Figure 2:
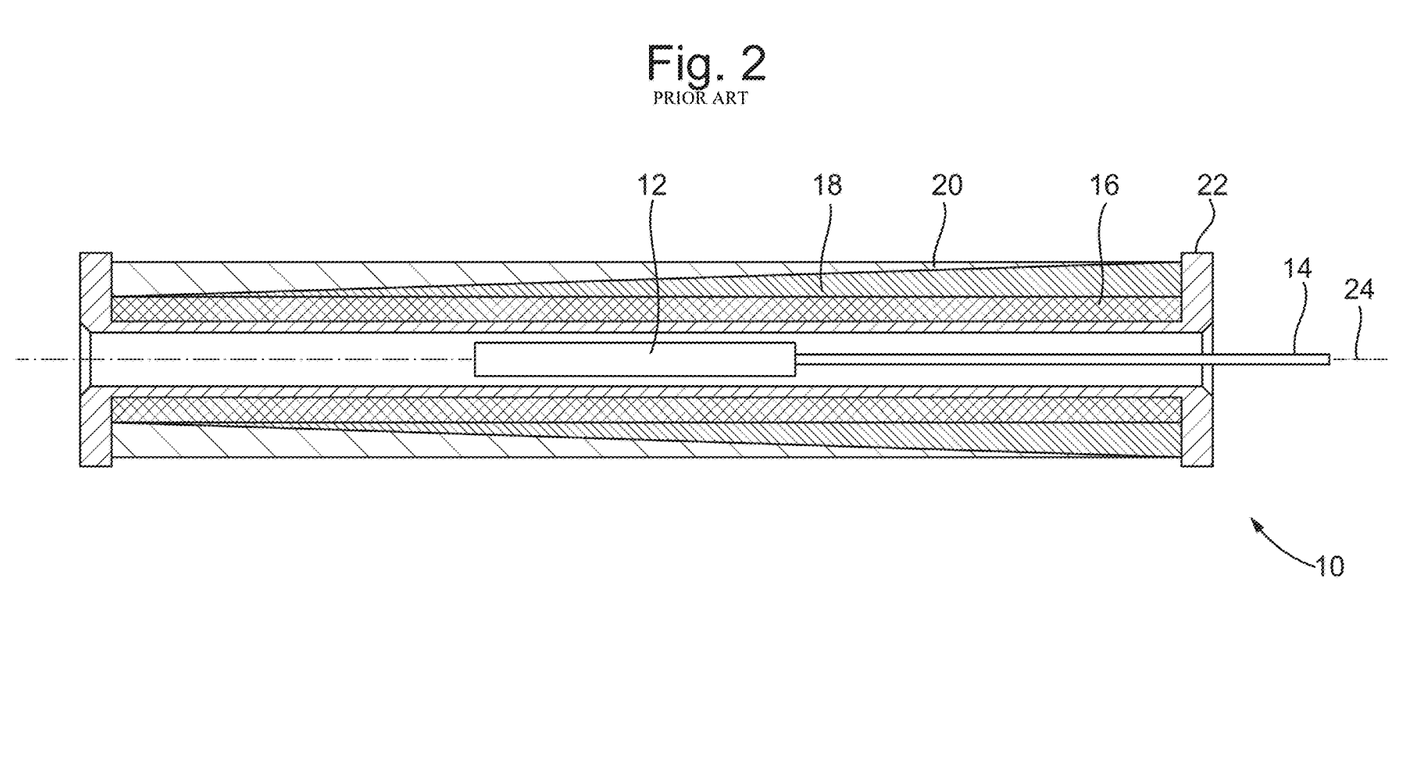
FIG. 2 shows a cross sectional view of a theoretically ideal conical winding configuration.

FIG. 2 shows a cross-sectional view of an LVDT in which each of the secondary coils is wound so as to have a conical configuration. As shown in FIG. 2, primary coil 16 is wound around a bobbin 22, through which the magnetic core 12 moves. The first and second secondary coils 18, 20, have then each been wound around the primary coil 16 so as to have a conical configuration. The conical configurations of the secondary coils 18,20 are shown schematically and to taper smoothly. However, their structure will be described in more detail in relation to FIGS. 3A-3B.

Figure 3A:
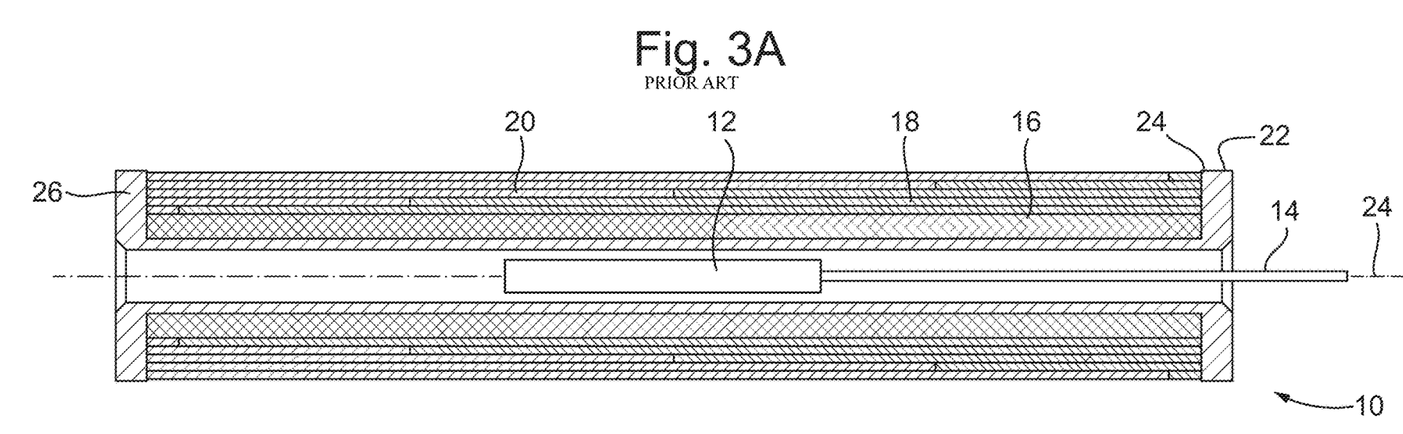
FIG. 3A shows a cross-sectional view of an LVDT comprising a full step winding configuration.

FIG. 3A shows a cross-sectional view of the LVDT 10 shown in FIG. 2, but illustrating the secondary windings 18,20 in slightly more detail. As described above, the primary coil 16 is wound around the bobbin 22. Each of the first and second secondary coils 18, 20, are then wound around the primary coil 16 in a step-wise manner so as to form a substantially conical configuration, as will be described below in relation to FIGS. 3B and 3C.

Figure 3B:
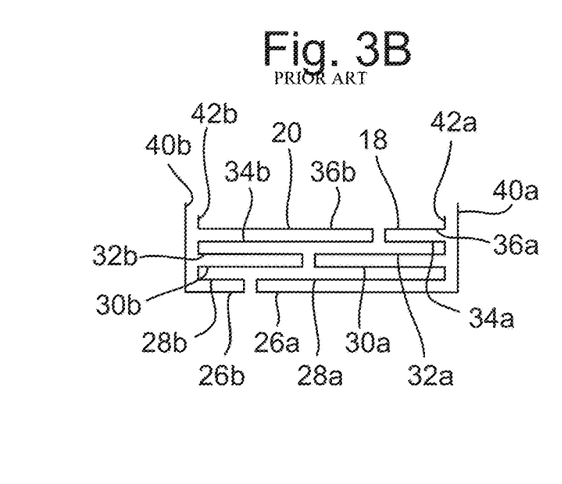
FIG. 3B shows a cross-sectional view of the upper portion of FIG. 3A, demonstrating the path along which the first and secondary coils are wound.
Figure 3C:
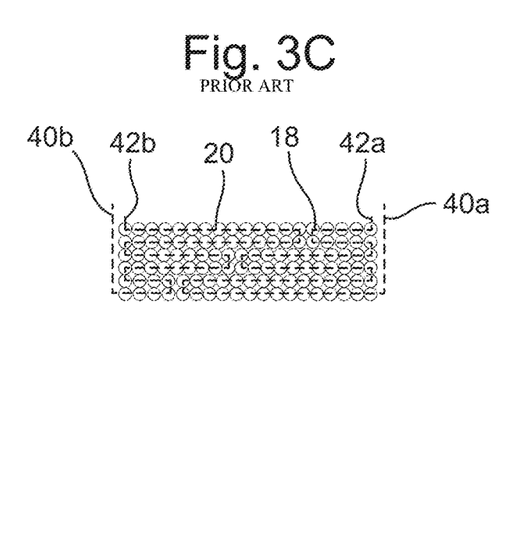
FIG. 3C is a cross-sectional view corresponding to FIG. 3A, but showing the cross-sections through the wires of the secondary windings.

FIG. 3B shows a cross-sectional view of the upper portion of FIG. 3A (above the bobbin 22), demonstrating the axial part of the path along which the first and secondary coils 18,20 are wound in FIG. 3A. FIG. 3C shows the same view, but illustrating the cross-sections through the wire of each of the secondary coils 18, 20, with the paths of FIG. 3B superimposed thereon.

As can be seen from FIGS. 3B-3C, the first secondary coil 18 is wound, starting at a first, distal end of the bobbin 22, whilst moving in a first axial direction along the longitudinal axis 24a, but only until part way to the second distal end of the bobbin 22 so as to form a first radially innermost layer 26a. The coil 18 continues to be wound whilst moving in a second, opposite axial direction along the longitudinal axis 24 until the first, distal end of the bobbin 22, thus forming a second layer 30B radially outward of the first layer 26a. The coil 18 continues to be wound whilst moving back in the first axial direction, but only part way along the axial extent of the first layer 26a, thus forming a third layer 30a that is radially outward of the second layer 30B and axially shorter than the second layer 30B. The coil 18 continues to be wound whilst moving back in the second, opposite axial direction along the longitudinal axis 24 until the first, distal end of the bobbin 22, thus forming a fourth layer 32a radially outward of the third layer 30a. The coil 18 continues to be wound whilst moving back in the first axial direction, but only part way along the axial extent of the fourth layer 32a, thus forming a fifth layer 34a that is radially outward of the fourth layer 32a and axially shorter than the fourth layer 34a. The coil 18 continues to be wound whilst moving back in the second, opposite axial direction along the longitudinal axis 24 until the first, distal end of the bobbin 22, thus forming a sixth layer 36a radially outward of the fifth layer 34a. The winding process finishes at the first, distal end of the bobbin 22. Only a cross-section of the upper portion of the first secondary coil 18 is shown in FIGS. 3B-3C, but it will be appreciated that the full view of it presents a substantially conical structure.

The second secondary coil 20 may be wound around the bobbin in the opposite circumferential direction to the first secondary coil 18. The second secondary coil 20 is wound, starting at the second, distal end of the bobbin 22, whilst moving in the second axial direction along the longitudinal axis 24, but only until (i.e. proximate to) the lateral edge of the first layer 26a of the first secondary coil 18 so as to form a first radially innermost layer 26b of the second secondary coil 20. The second secondary coil 20 continues to be wound whilst moving in the first, opposite axial direction along the longitudinal axis 24 until the second, distal end of the bobbin 22, thus forming a second layer 28b radially outward of the first layer 26a. The coil 20 continues to be wound whilst moving back in the second axial direction, but further than the axial extent of the second layer 28b of coil 20, thus forming a third layer 28a radially outward and around the second layer 28b of the second secondary coil 20 (and also radially outward and around part of the second layer of the first secondary coil 18). The third layer 28a of the second secondary coil 20 may axially extend until (i.e. proximate to) the edge of the third layer 30a of the first secondary coil 18. The coil 20 continues to be wound whilst moving back in the first axial direction along the longitudinal axis 24 until the second, distal end of the bobbin 22, thus forming a fourth layer 32b radially outward of the third layer 28a of coil 20. The coil 20 continues to be wound whilst moving back in the second axial direction, but further than the axial extent of the fourth layer 32b, thus forming a fifth layer 34b radially outward and around the fourth layer 32b of the second secondary coil 20 (and also radially outward and around part of the fourth layer 32a of the first secondary coil 18). The fifth layer 34b of the second secondary coil 20 may axially extend until (i.e. proximate to) the edge of the fifth layer 34a of the first secondary coil 18. The coil 20 continues to be wound whilst moving back in the first axial direction along the longitudinal axis 24 until the second, distal end of the bobbin 22, thus forming a sixth layer 36b radially outward of the fifth layer 34b. The winding process for coil 20 finishes at the second, distal end of the bobbin 22. Only a cross-section of the upper portion of the second secondary coil 20 is shown in FIGS. 3B-3C, but it will be appreciated that the full view of it presents a substantially conical structure. The winding configurations of the first and second secondary coils 18, 20 are complementary to each other such that the profiles of the axially inner ends of the coils 18,20 match each other and fit adjacent one another.

Figure 4A:
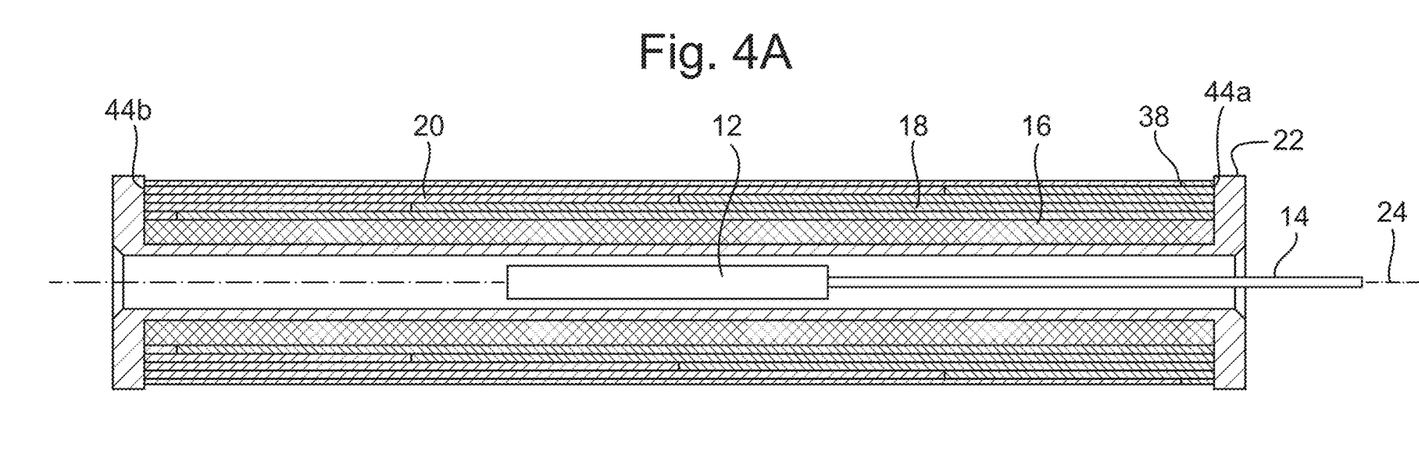
FIG. 4A shows a cross-sectional view of an LVDT comprising a partial step winding configuration according to an embodiment of the present disclosure.

FIG. 4A shows a cross section of an embodiment of the invention, in which the first and second secondary coils 18, 20 comprise partial step windings. FIG. 4A is the same as that shown in FIG. 3A, except that the radially outermost regions of the secondary coils are depicted as being thinner in FIG. 4A, since the outermost layer of each secondary coil is different, as will be described in relation to FIG. 4B onwards.

Figure 4B:
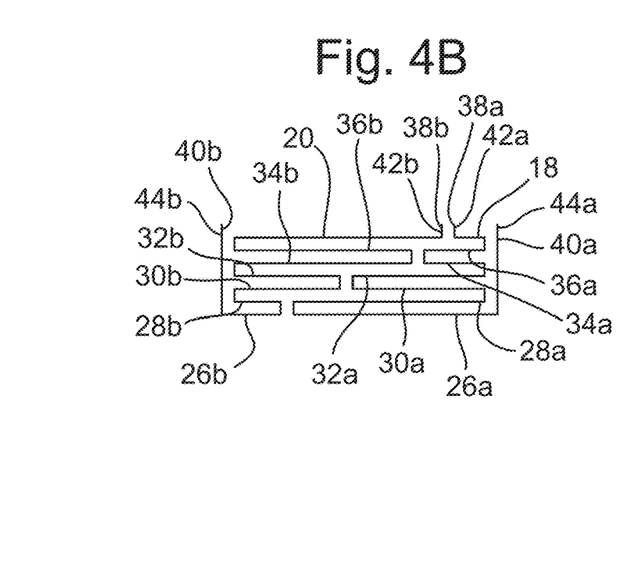
FIG. 4B shows a cross-sectional view of the upper portion of FIG. 4A, demonstrating the path along which the first and secondary coils are wound.

FIG. 4B shows a cross-sectional view of the upper portion of FIG. 4A (above the bobbin 22), demonstrating the axial part of the path along which the first and secondary coils 18,20 are wound in FIG. 4A. FIG. 4B corresponds to FIG. 3B, except wherein the secondary coils 18,20 are wound according to an embodiment of the present disclosure. As can be seen, initially the secondary coils are wound in the same manner as has been described in relation to FIG. 3B. However, rather than winding the radially outermost layer of each of the first and second secondary coils 18, 20 fully back to the distal ends of the bobbin 22, according to embodiments of the present disclosure the winding process of each of the secondary coils 18, 20 terminates at a respective location 38a,b that is spaced from the distal ends of the bobbin 22. This enables the two ends of each secondary coil 18, 20 to be spaced apart from each other, which enables the two non-wound end portions 40a,b, 42a,b, of each coil to be more easily distinguished from one another (e.g. during manufacture). The (non-wound) end portions 40a,b, 42a,b of each secondary winding are then more easily connected to an electric circuit. This arrangement also allows for better balancing of the volumes of the first and second secondary coils 18, 20, as will be discussed below. It thus mitigates the need for an additional resistor to compensate any volume difference (as coil volume is related to its resistance), or difference in the lengths of the wires forming the first and second secondary coils.

As the second secondary coil 20 is wound around the first secondary coil 18, and the layers increase in axial length with increasing radial distance from the longitudinal axis (as opposed to the layers of the first secondary coil 18, which decrease in axial length with increasing radial distance from the longitudinal axis), more of the windings of the second secondary coil 20 are located a greater distance from the longitudinal axis 24 than in the first secondary coil 18. These windings of coil 20 therefore have a relatively large circumference, i.e. requiring a longer length of wire than those closer to the longitudinal axis. Thus, if the first and second secondary coils 18,20 have the same cross sectional area (in a plane defined by the radial and longitudinal directions), the windings of the second secondary coil 20 require a greater length of wire to form the windings, than the first secondary coil 18, and the second secondary coil 20 has a larger volume (and hence resistance) than the first secondary coil 20. Using the winding technique of the embodiments described above provides a more even balance of the lengths of the wires in the coils 18,20 and, therefore, of the volumes (and resistances) of the first and second secondary coils 18,20. As described above in relation to FIG. 4B, in contrast to FIG. 3B, the wire in each secondary coil 18,20 is not wound to the axial ends of the bobbin when forming the outermost layers of the coils. As such, the embodiments enable the number of windings in the outermost layer of each coil 18,20 to be controlled and hence the length of the wires in the coils, the volumes of the coils and their resistances can be matched.

Figure 4C:
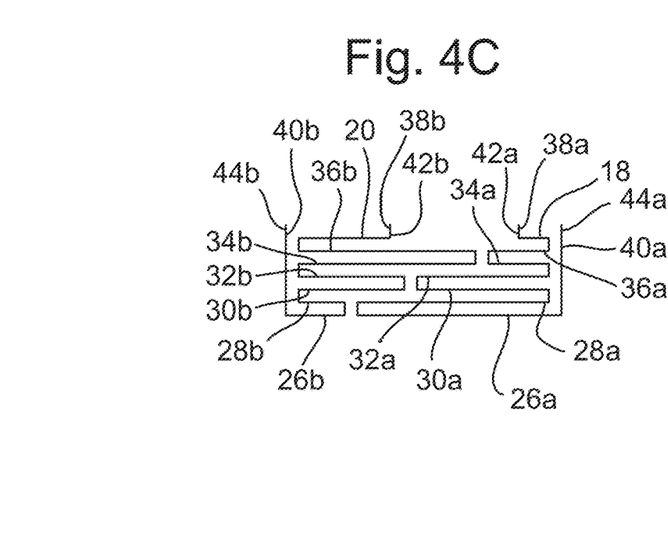
FIG. 4C shows an alternative embodiment demonstrating the path along which the first and secondary coils may be wound.

As shown in FIG. 4B, the winding process of each of the secondary coils 18,20 may terminate at locations 38a,b proximate or adjacent to one another, and axially spaced from the locations 44a,b, where the secondary coils 18, 20 begin. In other words, the location 38a at which the non-wound end portion 42a of coil 18 joins the wound portion of coil 18 is located proximate or adjacent the location 38b at which the non-wound end portion 42b of coil 20 joins the wound portion of coil 20. This enables the combination of the two radially outermost layers of the two coils to extend substantially all of the axial distance between the ends of the bobbin 22 Alternatively, as shown in FIG. 4C, the winding process of each of the secondary coils 18,20 may be such that the location at which the non-wound end portion 28b of coil 18 joins the wound portion of coil 18 is located spaced apart from the location at which the non-wound end portion 28b of coil 20 joins the wound portion of coil 20.

Although the present disclosure has been described with reference to various embodiments, it will be understood by those skilled in the art that various changes in form and detail may be made without departing from the scope of the invention as set forth in the accompanying claims.

Although the secondary coils have been described as stepped windings in a conical configuration, they may also be any other suitable arrangement of windings, which may or may not overlap with respect to one another. For example, although the secondary windings have been described as having conical configurations, it is contemplated that they may alternatively have cylindrical configurations.

Although the embodiments have been described wherein each of the secondary coils has a specific number of layers, it will be appreciated that each secondary coil may have any number of layers, and the different secondary coils may have different numbers of layers.

Although the first and second secondary coils have been described as axially overlapping one another, they may not.

Although the layers in the first and second secondary coils have been described as being axially adjacent one another, they may not be.

The volume of the secondary coils of the embodiments (e.g. FIGS. 4A and 4B) can be calculated as follows:

The initial assumptions:

$$s = n \cdot 2 - 1$$

where
s=number of layers of magnet wire in secondary coils, and is any odd natural number
n=number of steps in secondary coils (wherein each step is formed by two adjacent layers); and $$a_{(\frac{n}{2}+0.5)} = b_{(\frac{n}{2}+0.5)}$$

$$a + b \le \frac{l \cdot h_{ff}}{d_{mw}}$$

where "a" and "b" are equal to number of turns in a layer of secondary coils A (secondary coil 18 in the Figures) and B (secondary coil 20 in the Figures) respectively.

The number of magnet wire turns in secondary coil "A" can be calculated as:

$$Nt_a = \left[\sum_{i=1}^{n-1}(2a_1 - 4i \cdot r + 3r)\right] + (a_1 - (2n-2)r)$$

The number of magnet wire turns in secondary coil "B" can be calculated as:

$$Nt_b = \left[\sum_{i=1}^{n-1}(2b_1 + 4i \cdot r - 3r)\right] + (b_1 + (2n-2)r)$$

Based on the above formulas, it can be assumed that the total length of magnet wires used for "A" secondary coil winding is equal to:

$$l_{mwA} = \left[\sum_{i=1}^{n-1}(2a_1 - 4i \cdot r + 3r) \cdot (\pi(d_{sc} + (4i-2)d_{mw} \cdot v_{ff}))\right] +$$

$$[(a_1 - (2n-2)r) \cdot (\pi(d_{sc} + (4i-3)d_{mw} \cdot v_{ff}))]$$

and the length of magnet wires used for "B" secondary coil winding is:

$$l_{mwB} = \left[\sum_{i=1}^{n-1}(2a_1 + 4i \cdot r + 3r) \cdot (\pi(d_{sc} + (4i-2)d_{mw} \cdot v_{ff}))\right] +$$

$$[(b_1 + (2n-2)r) \cdot (\pi(d_{sc} + (4i-3)d_{mw} \cdot v_{ff}))]$$

where:
n—number of steps,
$b_1$, $a_1$—number of turns in first layer counted from the bobbin inner diameter,
r—theoretical increment of number of turns between each single layer,
i—step number,
$d_{sc}$—inner diameter of secondary coil,
$d_{mw}$ magnet wire diameter,
$h_{ff}$—winding horizontal fill factor,
$v_{ff}$—winding vertical fill factor,
$Nt_a$—number of turns in secondary coil part A,
$Nt_b$—number of turns in secondary coil part B,
$l_{mwA}$—length of magnet wire in secondary coil part A,
$l_{mwB}$—length of magnet wire in secondary coil part B.

The invention claimed is:

1. A linear variable differential transducer (LVDT) comprising:
a primary coil;
a first secondary coil; and
a second secondary coil;
wherein each of the first and second secondary coils comprises a wound portion that is wound around a longitudinal axis of the LVDT; and
wherein the wound portion of the first secondary coil meets first and second non-wound portions of the first secondary coil at locations that are separated from each other in a direction along the longitudinal axis, and the wound portion of the second secondary coil meets first and second non-wound portions of the second secondary coil at locations that are separated from each other in a direction along the longitudinal axis;
wherein the wound portion in each of the first and second secondary coils comprises a plurality of wound layers; and
wherein the wound portion of each of the first and second secondary coil comprises wound layers having different lengths in the longitudinal direction;
wherein the location at which the second non-wound portion of the first secondary coil meets the wound portion of the first secondary coil is longitudinally between a first end of the wound portion of the first secondary coil and an opposite, distal end of the wound portion of the first secondary coil; or
wherein the location at which the second non-wound portion of the second secondary coil meets the wound portion of the second secondary coil is longitudinally between a first end of the wound portion of the second secondary coil and an opposite end of the second secondary coil;
wherein the wound portion of the first secondary coil meets the first and second non-wound portions of the first secondary coil at locations that are spaced apart from each other in a direction along the longitudinal axis by a distance of ≥2 mm; and
the wound portion of the second secondary coil meets the first and second non-wound portions of the second secondary coil at locations that are spaced apart from each other in a direction along the longitudinal axis by a distance of ≥2 mm.

2. The LVDT of claim 1, wherein the wound portion in each of the first and second secondary coils consists of an odd number of wound layers.

3. The LVDT of claim 2, wherein the wound portions of the first and second secondary coils are arranged axially adjacent to one another such that axial ends of the layers in the wound portion of the first secondary coil are axially adjacent axial ends of the layers in the wound portion of the second secondary coil.

4. The LVDT of claim 1, wherein the wound layers of the first secondary coil have lengths in the longitudinal direction that decrease as a function of increasing radial distance within that coil; and wherein the wound layers of the second secondary coil have lengths in the longitudinal direction that increase as a function of increasing radial distance within that coil.

5. The LVDT of claim 4, wherein the wound portion of each of the first and second secondary coils has a conical configuration.

6. The LVDT of claim 1, wherein the first and second secondary coils are positioned circumferentially around the primary coil.

7. The LVDT of claim 1, further comprising:
a magnetic core located radially inside of the primary coil, wherein the magnetic core is mounted in the LVDT so as to be movable along the longitudinal axis.

8. The LVDT of claim 7, further comprising:
circuitry for determining the position of the magnetic core along the longitudinal axis from the potential difference between the first and second non-wound portions of the first secondary coil and from the potential difference between the first and second non-wound portions of the second secondary coil.

9. A method of forming an LVDT as claimed in claim 1, comprising:
i) winding a first wire around the longitudinal axis, starting at a first axial location, and whilst moving in a first axial direction along the longitudinal axis so as to form a first wound layer of the first secondary coil;
ii) winding the first wire around the longitudinal axis whilst moving in a second, opposite axial direction along the longitudinal axis so as to form a second wound layer of the first secondary coil; and
iii) repeating steps i) and ii) until the first secondary coil has the desired number of wound layers; wherein the winding is terminated at a second axial location that is spaced apart along the longitudinal axis from the first axial location;
iv) winding a second wire around the longitudinal axis, starting at a third axial location, and whilst moving in the second axial direction along the longitudinal axis so as to form a first wound layer of the second secondary coil;
v) winding the second wire around the longitudinal axis whilst moving in the first axial direction along the longitudinal axis so as to form a second wound layer of the second secondary coil; and
vi) repeating steps iv) and v) until the second secondary coil has the desired number of wound layers; wherein the winding is terminated at a fourth axial location that is spaced apart along the longitudinal axis from the third axial location.

10. The LVDT of claim 1, wherein ends of the first secondary coil and the second secondary coil are not connected to each other.

11. The LVDT of claim 1, wherein a portion of one of the first and second secondary coils is positioned circumferentially around at least a portion of the other of the first and second secondary coils.

12. The LVDT of claim 1, wherein the location at which the second non-wound portion of the first secondary coil meets the wound portion of the first secondary coil is longitudinally between a first end of the wound portion of the first secondary coil and an opposite end of the wound portion of the first secondary coil; and wherein the location at which the second non-wound portion of the second secondary coil meets the wound portion of the second secondary coil is longitudinally at an end of the wound portion of the second secondary coil.

* * * * *